US010187510B2

(12) United States Patent
Kim et al.

(10) Patent No.: US 10,187,510 B2
(45) Date of Patent: *Jan. 22, 2019

(54) MOBILE TERMINAL AND CONTROL METHOD THEREOF

(71) Applicant: LG ELECTRONICS INC., Seoul (KR)

(72) Inventors: Kiwan Kim, Seoul (KR); Jaeyoung Chae, Seoul (KR); Jiyen Son, Seoul (KR); Hyunjung Lee, Seoul (KR); Jongseok Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 3 days.

This patent is subject to a terminal disclaimer.

(21) Appl. No.: 15/227,378

(22) Filed: Aug. 3, 2016

(65) Prior Publication Data
US 2016/0344858 A1    Nov. 24, 2016

Related U.S. Application Data

(63) Continuation of application No. 14/262,346, filed on Apr. 25, 2014, now Pat. No. 9,444,926.
(Continued)

(30) Foreign Application Priority Data

Apr. 30, 2013    (KR) .................. 10-2013-0047988

(51) Int. Cl.
*H04M 1/72* (2006.01)
*G06F 3/0488* (2013.01)
(Continued)

(52) U.S. Cl.
CPC ........ *H04M 1/7253* (2013.01); *G06F 3/0488* (2013.01); *H04M 1/67* (2013.01);
(Continued)

(58) Field of Classification Search
CPC combination set(s) only.
See application file for complete search history.

(56) References Cited

U.S. PATENT DOCUMENTS 9,444,926 B2 *  9/2016  Kim .................. H04M 1/72561
2006/0041549 A1  2/2006  Gundersen et al.
(Continued)

FOREIGN PATENT DOCUMENTS

CN         102566914 A      7/2012
WO    WO 2007/102110 A2    9/2007

*Primary Examiner* — Steven Kelley
(74) *Attorney, Agent, or Firm* — Birch, Stewart, Kolasch & Birch, LLP

(57) ABSTRACT

A method of controlling a mobile terminal, and which includes establishing, via a wireless communication unit of the mobile terminal, a wireless data channel to an external device; receiving, via a controller of the mobile terminal, application execution information from the external device, said application execution information indicating an application executed on the external device that is to be executed on the mobile terminal; displaying, via the controller, a lock screen corresponding to the application to be executed on the mobile terminal on a touchscreen of the mobile terminal; receiving, via the controller, a lock release signal indicating the lock screen has been released; and executing the application on the mobile terminal when the lock screen is released.

16 Claims, 18 Drawing Sheets

Related U.S. Application Data

(60) Provisional application No. 61/816,708, filed on Apr. 27, 2013.

(51) Int. Cl.
  H04M 1/67 (2006.01)
  H04W 4/50 (2018.01)
  H04W 4/60 (2018.01)
  H04M 1/725 (2006.01)

(52) U.S. Cl.
  CPC ... H04M 1/72522 (2013.01); H04M 1/72525 (2013.01); H04M 1/72533 (2013.01); H04M 1/72561 (2013.01); H04M 1/72577 (2013.01); H04W 4/50 (2018.02); H04W 4/60 (2018.02); H04M 2250/22 (2013.01); H04M 2250/64 (2013.01)

(56) References Cited

U.S. PATENT DOCUMENTS

| | | | |
|---|---|---|---|
| 2009/0239557 A1* | 9/2009 | Kadakia | H04H 20/34 455/466 |
| 2010/0082136 A1 | 4/2010 | Rosenblatt et al. | |
| 2011/0028186 A1 | 2/2011 | Lee et al. | |
| 2011/0105193 A1* | 5/2011 | Lee | G06F 3/0488 455/566 |
| 2011/0161423 A1 | 6/2011 | Pratt et al. | |
| 2011/0271181 A1 | 11/2011 | Tsai et al. | |
| 2012/0042087 A1 | 2/2012 | Berg et al. | |
| 2012/0046077 A1* | 2/2012 | Kim | H04M 1/72577 455/566 |
| 2012/0109986 A1* | 5/2012 | Palermiti, II | G06F 17/30058 707/754 |
| 2012/0173622 A1* | 7/2012 | Toledano | H04L 65/4076 709/204 |
| 2012/0322368 A1 | 12/2012 | Desai et al. | |
| 2013/0053105 A1* | 2/2013 | Lee | H04M 1/673 455/565 |
| 2013/0054720 A1 | 2/2013 | Kang et al. | |
| 2013/0187753 A1 | 7/2013 | Chiriyankandath | |
| 2013/0275531 A1* | 10/2013 | Hahm | H04W 4/12 709/206 |
| 2013/0332856 A1* | 12/2013 | Sanders | G06F 3/0481 715/753 |
| 2014/0018053 A1* | 1/2014 | Cho | G06F 3/0488 455/418 |
| 2014/0063174 A1 | 3/2014 | Junuzovic et al. | |
| 2014/0171064 A1* | 6/2014 | Das | H04W 84/18 455/426.1 |
| 2014/0240440 A1* | 8/2014 | Seo | H04L 51/04 348/14.03 |
| 2014/0359454 A1* | 12/2014 | Lee | G06F 3/0488 715/734 |
| 2015/0339466 A1* | 11/2015 | Gao | G06F 21/31 726/16 |

* cited by examiner (a)    (b)

(c)

(a) (b)

(a)

(b)

(c)

(a)          (b)

(c)

(a)

(b)

(a)  (b)

(a)

(b)

(c)

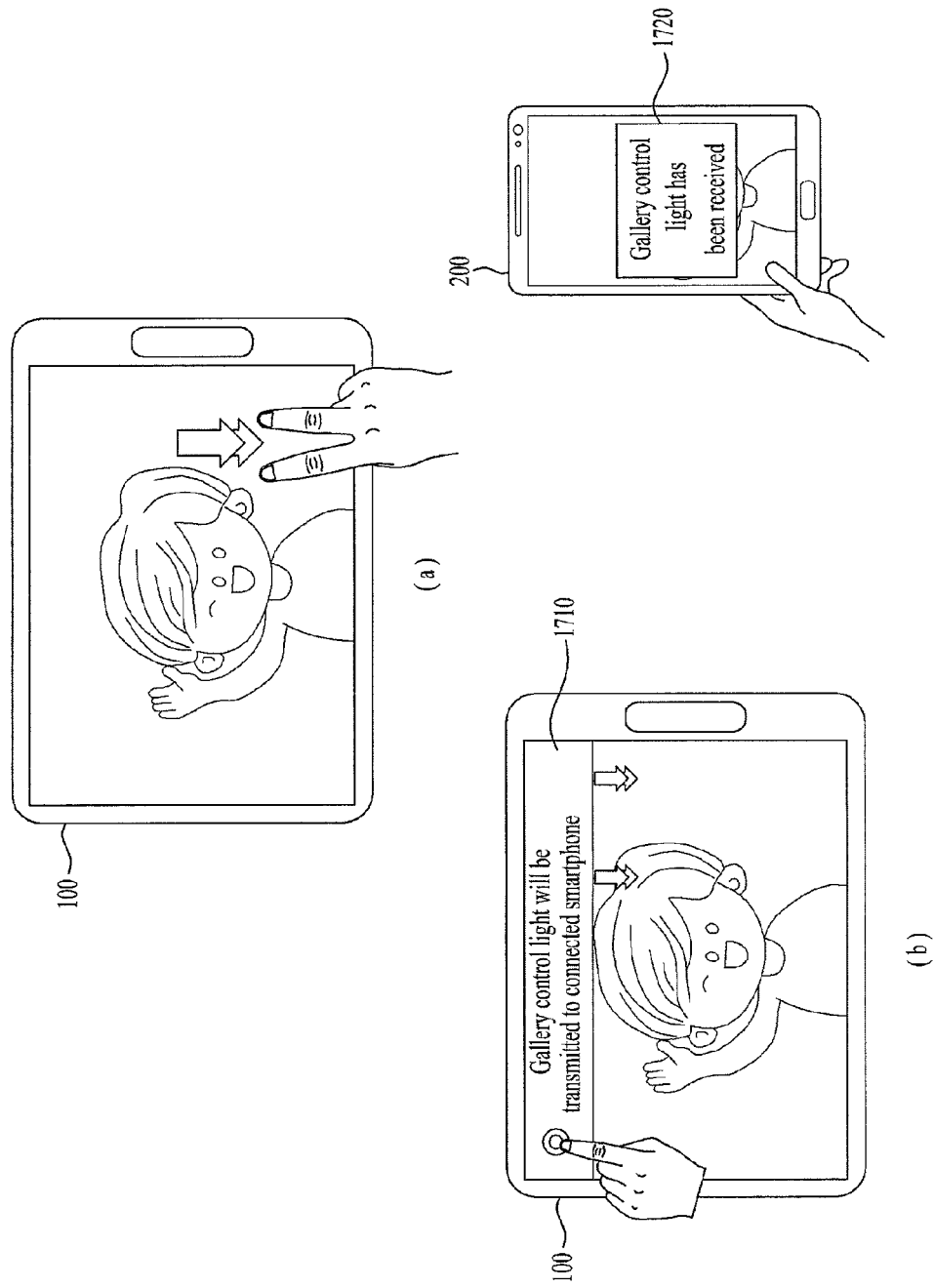

MOBILE TERMINAL AND CONTROL METHOD THEREOF

This application is a Continuation of copending U.S. application Ser. No. 14/262,346, filed on Apr. 25, 2014, which claims priority under 35 U.S.C. § 119(e) to U.S. Provisional Application No. 61/816,708, filed on Apr. 27, 2013, and under 35 U.S.C. § 119(a) to Application No. 10-2013-0047988, filed in the Republic of Korea on Apr. 30, 2013, all of which are hereby expressly incorporated by reference into the present application.

BACKGROUND OF THE INVENTION

Field of the Invention

The present invention relates to a mobile terminal and a control method thereof and, more particularly, to a mobile terminal that can be synchronized with an external device to seamlessly execute the same function and a control method thereof.

Discussion of the Related Art

Based on whether terminals are movable, the terminals may be classified into mobile or portable terminals and stationary terminals. Based on whether users can directly carry the mobile terminals with them, the mobile terminals may be classified into handheld terminals and vehicle mount terminals.

With diversification of functions of such terminals, the terminals have been embodied in the form of a multimedia player having multiple functions, such as photographing or video recording, reproduction of music or video files, gaming, and broadcast reception.

Recently, it has been possible to execute the same function, e.g., the same application, through different mobile terminals with popularization of smartphone type mobile terminals. As a result, there is a need for a user having a plurality of terminals to seamlessly use a specific application executed by one terminal through another terminal.

SUMMARY OF THE INVENTION

Accordingly, one object of the present invention is directed a mobile terminal and a control method thereof that substantially obviate one or more problems due to limitations and disadvantages of the related art.

Another object of the present invention is to provide a mobile terminal capable of seamlessly executing an application executed by an external device and a control method thereof.

Another object of the present invention is to provide a mobile terminal that can, when a task of an application executed on an external device or even the application is not finished, executing the corresponding application while maintaining the execution state of the application and a control method thereof Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a wireless communication unit for establishing a data channel to an external device and receiving application execution information of the external device from the external device, a touchscreen for displaying a lock screen corresponding to the application execution information, and a controller for, when the lock screen is released so as to correspond to a first application of the application execution information, executing the first application.

In another aspect of the present invention, a control method of a mobile terminal includes establishing a data channel to an external device, receiving application execution information of the external device from the external device, displaying a lock screen corresponding to the application execution information on a touchscreen, and, when the lock screen is released so as to correspond to a first application of the application execution information, executing the first application.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 17 is a view showing an example of a method of transmitting a control right to an external device in a mobile terminal according to a further embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used to denote elements in order to facilitate the invention only. Therefore, significant meanings or roles are not given to the suffixes themselves, and it is understood that the suffixes 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
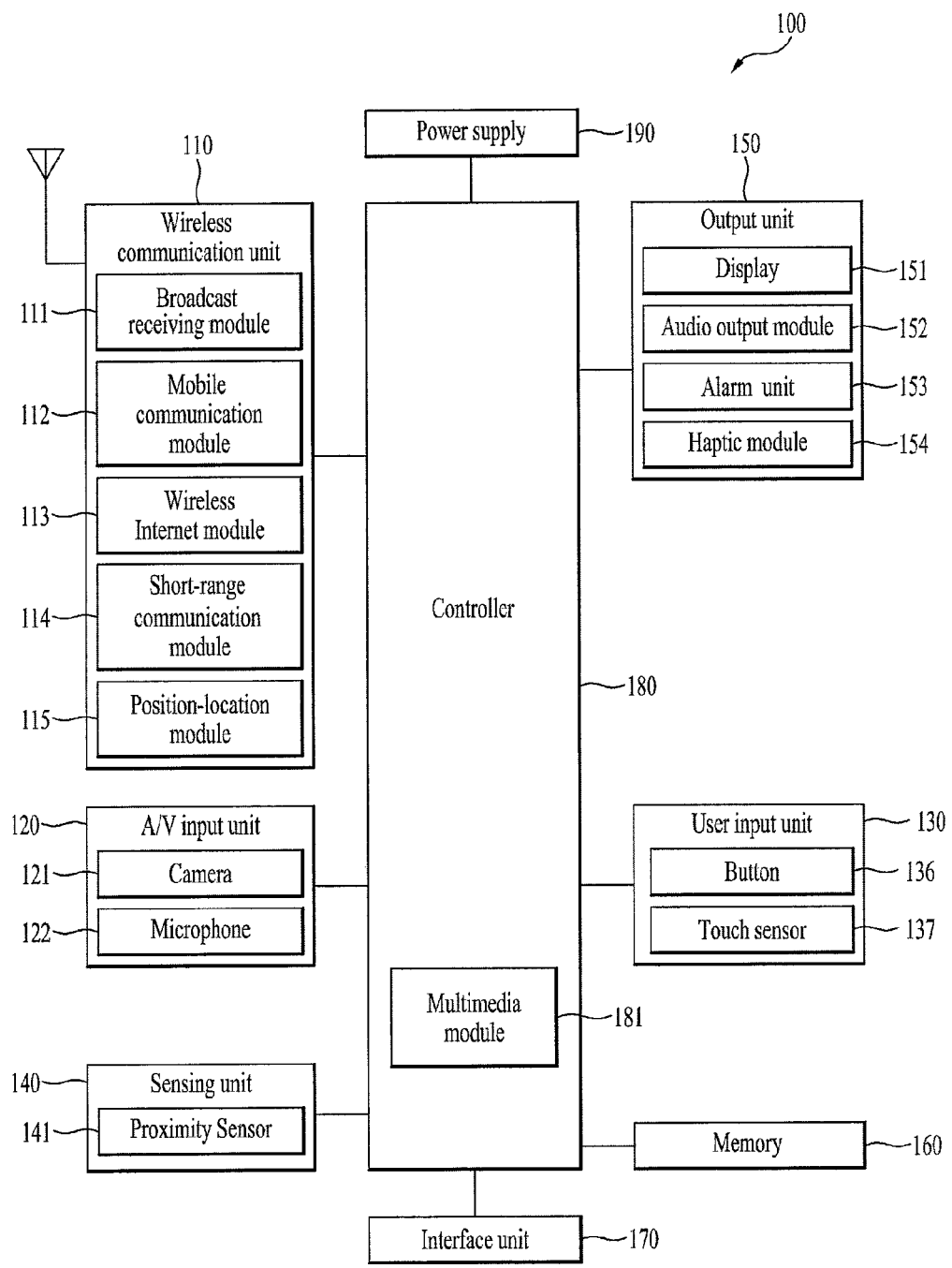
FIG. 1 is a block diagram of a mobile terminal according to an embodiment of the present invention.

FIG. 1 is a block diagram of a mobile terminal 100 in accordance with an embodiment of the present invention. With reference to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 1 shows the mobile terminal 100 having various components, but implementing all of the illustrated components is not a requirement. More or fewer components may be implemented according to various embodiments.

The wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 113 supports Internet access for the mobile terminal 100. This module may be internally or externally coupled to the mobile terminal 100. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 113 may be considered as being a kind of the mobile communication module 112 to perform the wireless Internet access via the mobile communication network.

The short-range communication module 114 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 115 identifies or otherwise obtains the location of the mobile terminal 100. According to one embodiment, this module may be implemented with a global positioning system (GPS) module. The GPS module 115 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and time information are then amended (or corrected) using another satellite. In addition, the GPS module 115 can calculate speed information by continuously calculating a real-time current location.

With continued reference to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Furthermore, the processed image frames can be displayed on the display 151.

The image frames processed by the camera 121 can be stored in the memory 160 or can be transmitted to an external recipient via the wireless communication unit 110. Optionally, at least two cameras 121 can be provided in the mobile terminal 100 according to the environment of usage.

The microphone 122 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 112 in a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, and a jog switch. FIG. 1 also illustrates the user input unit 130 can include a button 136 (hard or soft button) and a touch sensor 137.

The sensing unit 140 provides sensing signals for controlling operations of the mobile terminal 100 using status measurements of various aspects of the mobile terminal. For instance, the sensing unit 140 may detect an open/closed status of the mobile terminal 100, the relative positioning of components (e.g., a display and keypad) of the mobile terminal 100, a change of position (or location) of the mobile terminal 100 or a component of the mobile terminal 100, a presence or absence of user contact with the mobile terminal 100, and an orientation or acceleration/deceleration of the mobile terminal 100.

As an example, a mobile terminal 100 configured as a slide-type mobile terminal is considered. In this configuration, the sensing unit 140 may sense whether a sliding portion of the mobile terminal is open or closed. According to other examples, the sensing unit 140 senses the presence or absence of power provided by the power supply unit 190, and the presence or absence of a coupling or other connection between the interface unit 170 and an external device. According to one embodiment, the sensing unit 140 can include a proximity sensor 141.

The output unit 150 generates output relevant to the senses of sight, hearing, and touch. Furthermore, the output unit 150 includes the display 151, an audio output module 152, an alarm unit 153, a haptic module 154, a projector module, etc.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the displays can be implemented in a transparent or optical transmittive type, i.e., a transparent display. A representative example of the transparent display is the TOLED (transparent OLED). A rear configuration of the display 151 can be implemented as the optical transmittive type as well. In this configuration, a user can be able to see an object located at the rear of a terminal body on a portion of the display 151 of the terminal body.

At least two displays 151 can be provided in the mobile terminal 100 in accordance with one embodiment of the mobile terminal 100. For instance, a plurality of displays can be arranged to be spaced apart from each other or to form a single body on a single face of the mobile terminal 100. Alternatively, a plurality of displays can be arranged on different faces of the mobile terminal 100.

If the display 151 and a sensor for detecting a touch action (hereinafter called 'touch sensor') are configured as a mutual layer structure (hereinafter called 'touchscreen'), the display 151 is usable as an input device as well as an output device. In this instance, the touch sensor can be configured as a touch film, a touch sheet, or a touchpad.

The touch sensor can be configured to convert pressure applied to a specific portion of the display 151 or a variation of capacitance generated from a specific portion of the display 151 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 180. Therefore, the controller 180 is made aware when a prescribed portion of the display 151 is touched.

Referring to FIG. 1, a proximity sensor 141 can be provided at an internal area of the mobile terminal 100 enclosed by the touchscreen or around the touchscreen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 141 is more durable than a contact type sensor and also has utility broader than the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touchscreen includes the electrostatic capacity proximity sensor, it is configured to detect the proximity of a pointer using a variation of an electric field according to the proximity of the pointer. In this configuration, the touchscreen (touch sensor) can be considered as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may be named 'contact touch'. In addition, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, and a broadcast reception mode to output audio data which is received from the wireless communication unit 110 or is stored in the memory 160. During operation, the audio output module 152 outputs audio relating to a particular function (e.g., call received, message received). The audio output module 152 may be implemented using one or more speakers, buzzers, other audio producing devices, and combinations of these devices.

The alarm unit 153 outputs a signal for announcing the occurrence of a particular event associated with the mobile terminal 100. Typical events include a call received, a message received and a touch input received. The alarm unit 153 can output a signal for announcing the event occurrence by way of vibration as well as video or audio signal. The video or audio signal can be output via the display 151 or the audio output module 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. The strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 154 can be implemented to enable a user to sense the tactile effect through a muscle sense of a finger or an arm as well as to transfer the tactile effect through direct contact. Optionally, at least two haptic modules 154 can be provided in the mobile terminal 100 in accordance with an embodiment of the mobile terminal 100.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 160.

Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 100 can operate in association with a web storage for performing a storage function of the memory 160 on the Internet.

The interface unit 170 may be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 100 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, and video calls. The controller 180 can include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by various components of the mobile terminal 100. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 180.

Figure 2:
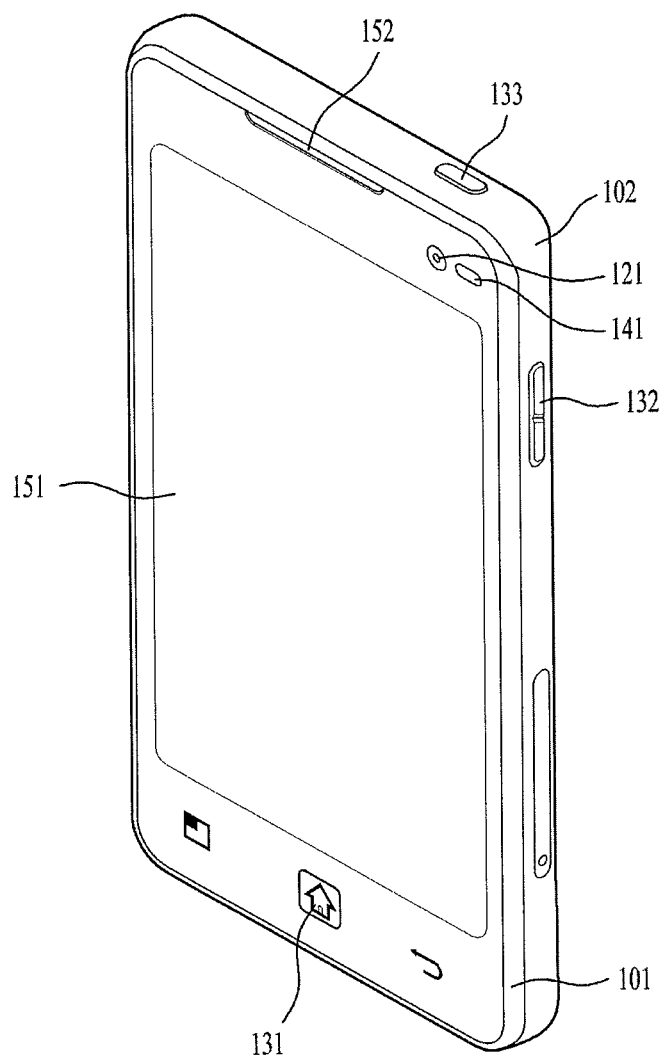
FIG. 2 is a front perspective view of the mobile terminal according to the embodiment of the present invention.

FIG. 2 is a front perspective view of a mobile terminal according to one embodiment of the present invention. The mobile terminal 100 illustrated in FIG. 2 has a bar type terminal body. However, the mobile terminal 100 may be implemented in a variety of different configurations. Examples of such configurations include folder-type, slide-type, rotational-type, swing-type and combinations thereof. For ease of description, the following invention will primarily relate to a bar-type mobile terminal 100. However, the present invention applies equally to other types of mobile terminals.

Referring to FIG. 2, the mobile terminal 100 includes a case (a casing, housing, or cover) constituting an exterior of the mobile terminal. In the present embodiment, the case can be divided into a front case 101 and a rear case 102. Various electric/electronic parts are loaded in a space (volume) provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output module 152, a camera 121, manipulating units 131 and 132, a microphone 122, and an interface unit 170 can be provided at the terminal body, and more particularly, at the front case 101. Manipulating units 131 and 132 are part of the user input unit 130.

The display 151 occupies most of a main face of the front case 101. The audio output module 152 and the camera 121 are provided at an area adjacent to an end portion of the display 151, while the manipulating unit 131 and the microphone 122 are provided at an area adjacent to the other end portion of the display 151. The manipulating unit 132 and the interface unit 170 can be provided at lateral sides of the front and rear cases 101 and 102. Another manipulating unit 133 can be provided on a top portion of the case 102.

The user input unit 130 is manipulated (operated) to receive a command for controlling an operation of the terminal 100. Furthermore, the user input unit 130 may include a plurality of manipulating units 131 and 132. The manipulating units 131 and 132 can be referred to as a manipulating portion and may adopt any tactile mechanism that enables a user to perform a manipulation action by touch.

Content input by manipulating units 131 and 132 can be divided between the two. For instance, a command such as start, end, and scroll is input to first manipulating unit 131. Furthermore, a command for a volume adjustment of sound output from the audio output module 152, or a command for a switching to a touch recognizing mode of the display 151 can be input to second manipulating unit 132.

Meanwhile, such a graphic for pointing at a specific object on a display unit or selecting a menu from the display unit as an arrow, a finger and the like is called a pointer or a cursor. However, the pointer is frequently used to mean a finger, a stylus pen or the like for a touch manipulation and the like. In order to clearly discriminate the pointer and the cursor from each other in this invention, a graphic displayed on a display unit is named a cursor and such a physical means for performing a touch, a proximity touch, a gesture and the like as a finger, a stylus pen and the like is named a pointer.

Provision of Seamlessness of an Application Between Different Devices

An embodiment of the present invention provides a method of seamlessly executing a task executed through an application executed by an external device using execution information of the application in a mobile terminal when the mobile terminal is connected to the external device through a predetermined data channel. Here, seamless execution of a task means that a task executed by one device is continued to another device. For example, when a user switches from an external device to a mobile terminal when a specific video has been reproduced for 1 minute 10 seconds in the external device, the video may be reproduced from 1 minute 11 seconds in the mobile terminal.

For the convenience of description, it is assumed that the external device is a smartphone and the mobile terminal is a tablet PC, which, however, is merely illustrative. The external device may be a tablet PC and the mobile terminal can be a smartphone. Alternatively, both the external device and the mobile terminal can be smartphones or tablet PCs.

Figure 3:
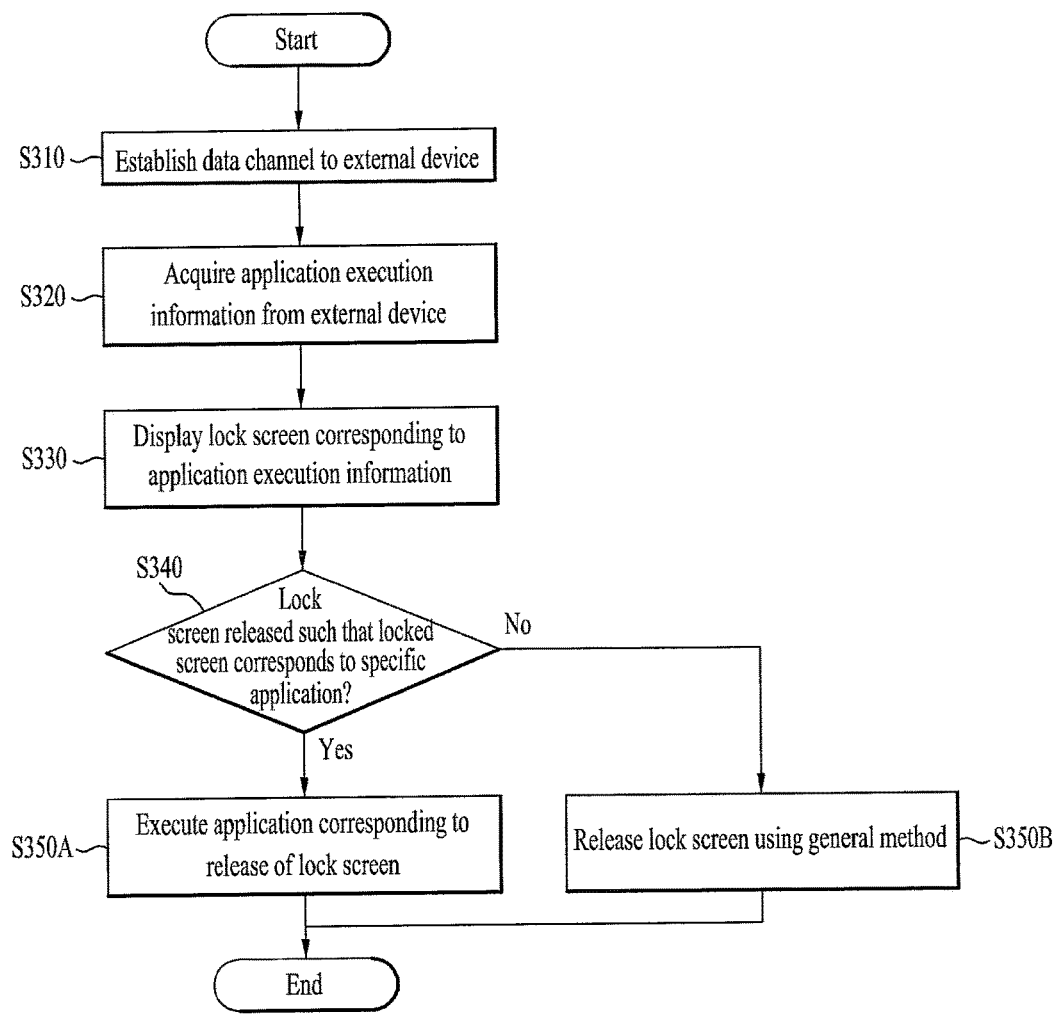
FIG. 3 is a flowchart showing an example of a process of seamlessly executing an application executed by an external device in the mobile terminal according to the embodiment of the present invention.

FIG. 3 is a flowchart showing a method of seamlessly executing an application executed by an external device in the mobile terminal according to an embodiment of the present invention. Referring to FIG. 3, a data channel to the external device is established (S310).

The data channel may be established using various near field communication methods, such as Wi-Fi Direct, Digital Living Network Alliance (DLNA), and Bluetooth, which, however, is merely illustrative. Communication methods are not restricted so long as the external device and the mobile terminal 100 can exchange data with each other according to a predetermined protocol. The data channel may be established by the user inputting a command to establish a data channel through the mobile terminal or the external device or by satisfying a predetermined condition (e.g., arrival at specific time or position or one device detecting another device through periodic scanning).

When the data channel is established, the mobile terminal can acquire application execution information from the external device through the established data channel (S320). Here, the application execution information may mean information used to seamlessly execute an application that is being executed or has been recently executed by the external device in the mobile terminal, such as application identification information indicating a kind of an application that has been recently executed or is being executed by the external device and the use details per application.

In addition, the use details may include a list of contents that have been reproduced/read, reproduction progress, and a screenshot of video that is being currently executed. Such application execution information may be acquired by the mobile terminal based on an event (e.g., execution/finish of an application, task change, such as start/pause of content reading in an application that is being executed, or touchscreen enabling/disabling of the external device and/or the mobile terminal) or periodically.

Subsequently, when the mobile terminal is manipulated by the user, for example, the sensing unit 140 senses the user raising the mobile terminal or the user manipulates a home key button, the controller 180 displays a lock screen corresponding to the application execution information (S330). Here, the lock screen may mean a screen displayed when at least some functions (e.g., entry into a home screen) of the mobile terminal are restricted excluding specific functions provided by the lock screen before a specific command is input.

In addition, correspondence to the execution information may mean display of information corresponding to the application execution information in a specific region on the lock screen. Besides, information corresponding to the application execution information may include a screenshot of the last execution screen, text describing the last execution status, and text/symbol/image indicating kind of the latest executed application.

When the lock screen is released such that an application to provide seamlessness can be specified, i.e., the lock screen corresponds to a specific application, when the lock screen is displayed (S340), the controller 180 can execute the corresponding application (S350A). Further, the corresponding application may be displayed when the corresponding application has been executed last in the external device such that task seamlessness can be provided to the user. When the lock screen is released using a general method without correspondence to a specific application, the mobile terminal can display a home screen or redisplay an image displayed before the touchscreen 151 is turned off (S350B).

Hereinafter, detailed examples which various applications executed by the external device are seamlessly executed by the mobile terminal will be described with reference to the accompanying drawings.

Provision of Seamlessness of a Video Application

First, examples related to a video application will be described with reference to FIGS. 4A to 8. In the following drawings, it is assumed that a data channel has been established between the mobile terminal and the external device. In particular, FIGS. 4A and 4B are views showing an example of a video application, reproduction of which has been paused, of the external device is driven through the mobile terminal.

Figure 4A:
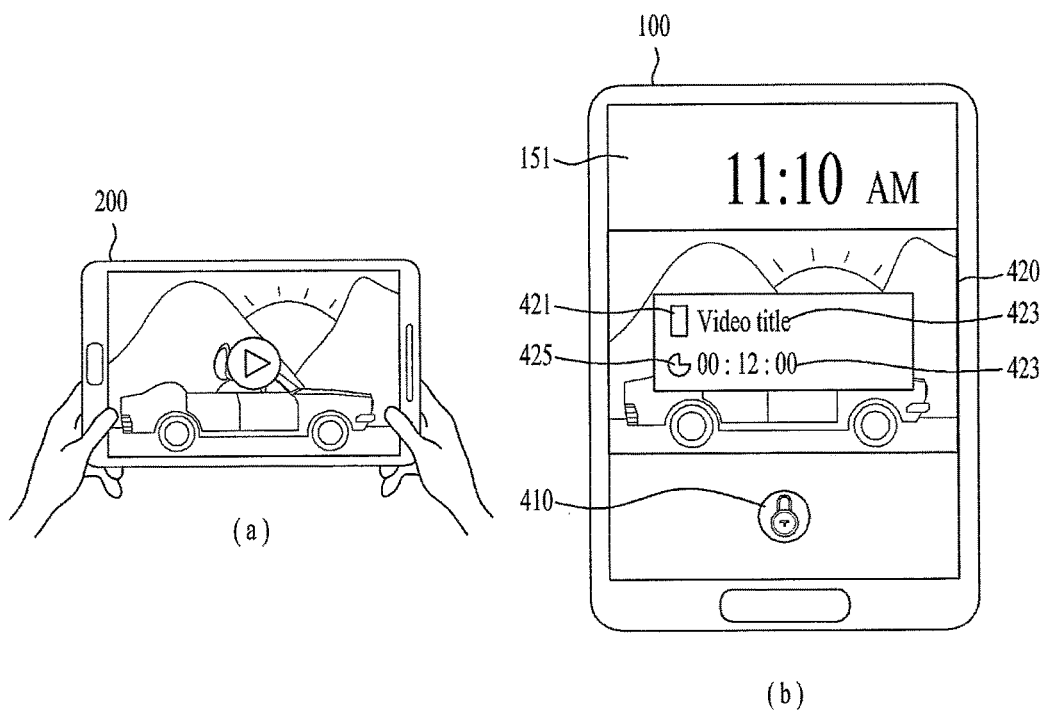
FIGS. 4A and 4B are views showing an example of a form in which a video application, reproduction of which has been paused, of the external device is driven through the mobile terminal.

FIG. 4A(a) shows video content reproduced by the external device 200 is paused. When the user manipulates the mobile terminal 100 to invoke a lock screen (for example, the user raises the mobile terminal or manipulates a specific key button), the lock screen is displayed as shown in FIG. 4A(b).

In particular, an indicator 410 to release the lock screen and application information 420 based on application execution information are displayed on the lock screen. In this embodiment, it is assumed that the lock screen is released by dragging the indicator 410 a predetermined distance or more. More specifically, together with a screenshot of the last execution screen of an application that has been executed last by the external device 200, i.e. a video application, an icon 421 corresponding to a source device (external device) of the corresponding application, a title 423 of content that has been reproduced, an indicator 425 indicating a ratio of reproduction time to the entire content, and information 427 regarding a reproduction stop time can be displayed as the application information 420. The user can acquire information regarding the type of an application that can be seamlessly executed and an execution status of the application through the application information 420.

Figure 4B:
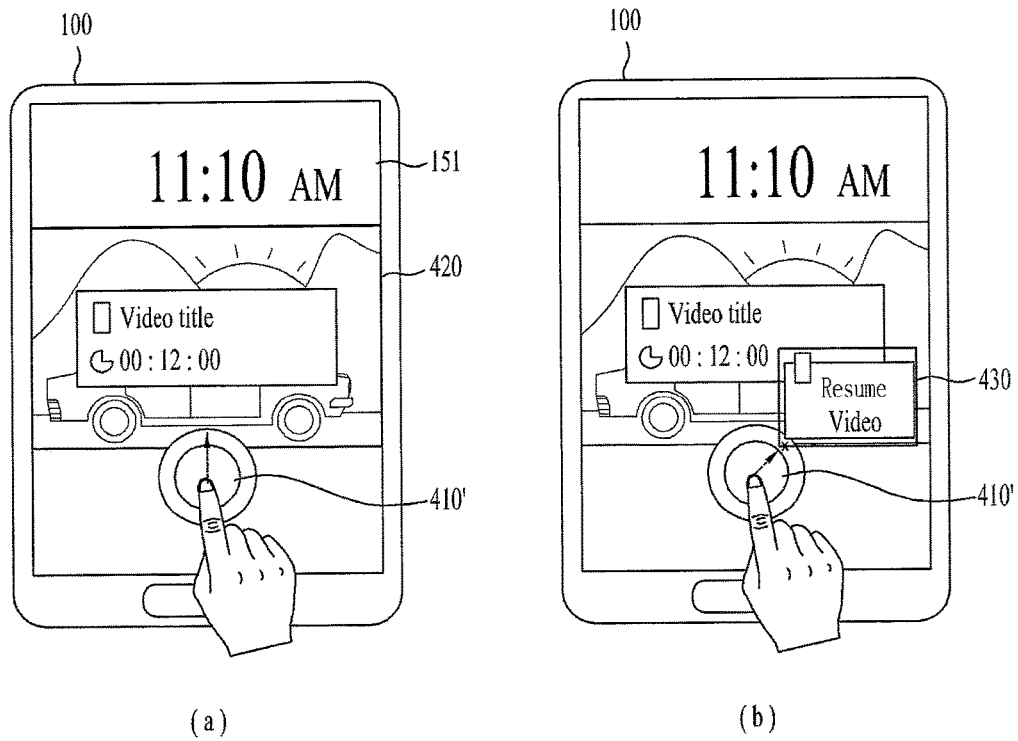
Figure 4B:
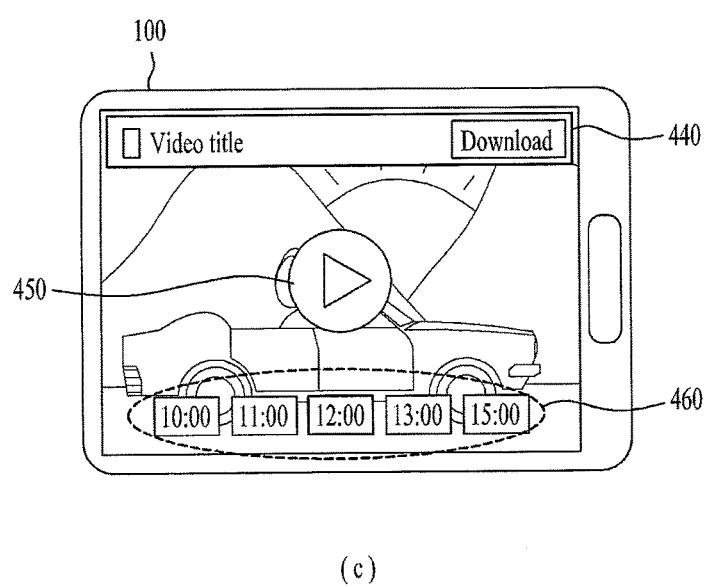

In this state, the user can drag the pointer to a region in which the application information 420 is displayed while touching the indicator 410 to release the lock screen and then release the touch input as shown in FIG. 4B(a). Alternatively, the user can drag the pointer to an application indicator 430 that can be seamlessly executed, displayed by touching the indicator 410, and then release the touch input as shown in FIG. 4B(b).

As a result, the video application is executed on the touchscreen of the mobile terminal 100 as shown in FIG. 4B(c). Further, the mobile terminal 100 can execute the video application in a reproduction pause state as in the last state of the video application on the external device 200. Consequently, a playing button 450 to resume reproduction may be displayed at the middle of the touchscreen of the mobile terminal 100.

Meanwhile, content information 440 indicating the source device, the title of the content, and whether download is possible may be displayed at the upper end of the execution screen and a list 460 of other selectable reproduction time periods may be displayed at the lower end of the execution screen. In addition, upon sensing touch input on the indicator 410 to release the lock screen, the controller 180 can change the indicator 410 into an indicator 410' to visually indicate sensing of the touch input.

When the touch drag input starting from the indicator to release the lock screen is dragged and then released in a region in which the application information 420 is displayed or a region in which the application indicator 430 is not displayed, a home screen or an execution screen that has been displayed before the mobile terminal enters the lock screen may be displayed.

FIGS. 4A and 4B assume the video application is paused on the external device 200. When the lock screen of the mobile terminal 100 is invoked while the corresponding content is being reproduced on the external device 200 through the video application and the lock screen is released using the method as shown in FIG. 4B(*a*) or 4B(*b*), the mobile terminal 100 can automatically resume reproduction of the corresponding content. In this instance, the playing button 450 and the list 460 of other selectable reproduction time periods may not be displayed since the video is already being reproduced.

Hereinafter, when the lock screen of the mobile terminal 100 is invoked when the video application has been finished on the external device 200 will be described with reference to FIG. 5. In particular, FIG. 5 is a view showing an example of a method of successively executing an application, execution of which has finished, of the external device 200 in the mobile terminal 100 according to the embodiment of the present invention.

When execution of a video application has finished on the external device 200, application execution information acquired by the mobile terminal 100 can include information regarding an application that has been executed and then finished instead of information regarding an application that is being executed on the external device 200.

Figure 5:
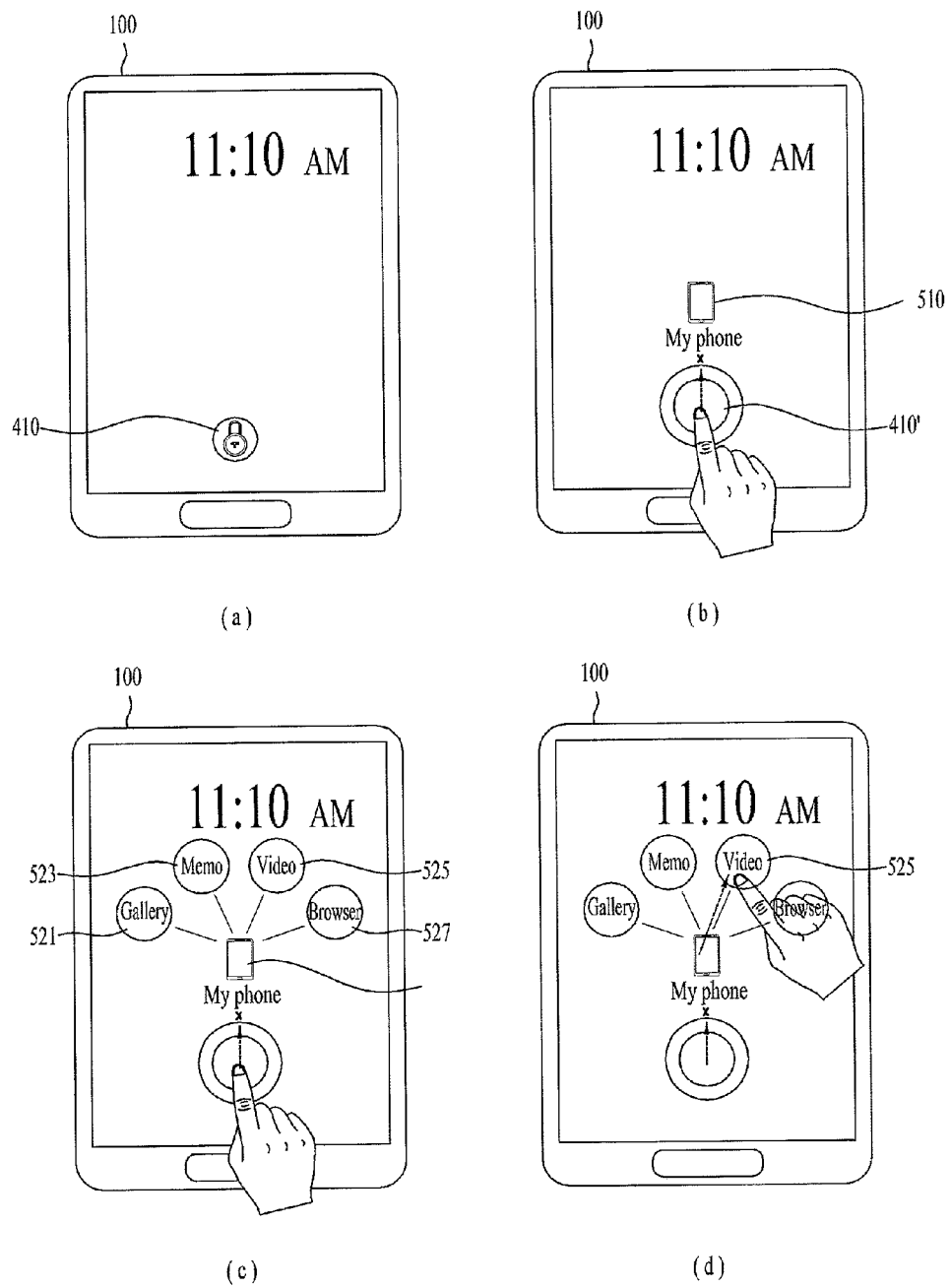
FIG. 5 is a view showing an example of a method of successively executing an application, execution of which has been finished, of the external device in the mobile terminal according to the embodiment of the present invention.

When the lock screen of the mobile terminal is invoked, therefore, the application information 420 is not displayed as shown in FIG. 5(*a*) unlike FIG. 4A(*a*). On the other hand, when the indicator 410 to release the lock screen is touched, an icon 510 corresponding to an external device 200 having an established data channel may be displayed on the lock screen as shown in FIG. 5(*b*).

When the pointer is dragged to the icon 510 in this state, the controller 180 can display icons 521 to 527 corresponding to the respective applications that have been recently executed in the external device 200 in the vicinity of the icon 510 as shown in FIG. 5(*c*). When the pointer is dragged to the icon 525 corresponding to a video application and then the touch input is released, the controller 180 can execute the video application.

However, the same application as that executed by the external device 200 may not be installed in the mobile terminal 100 and the content reproduced by the external device 200 may not be prestored in the memory 160 of the mobile terminal 100. Operation of the mobile terminal 100 in this situation will be described with reference to FIGS. 6 to 8.

Figure 6:
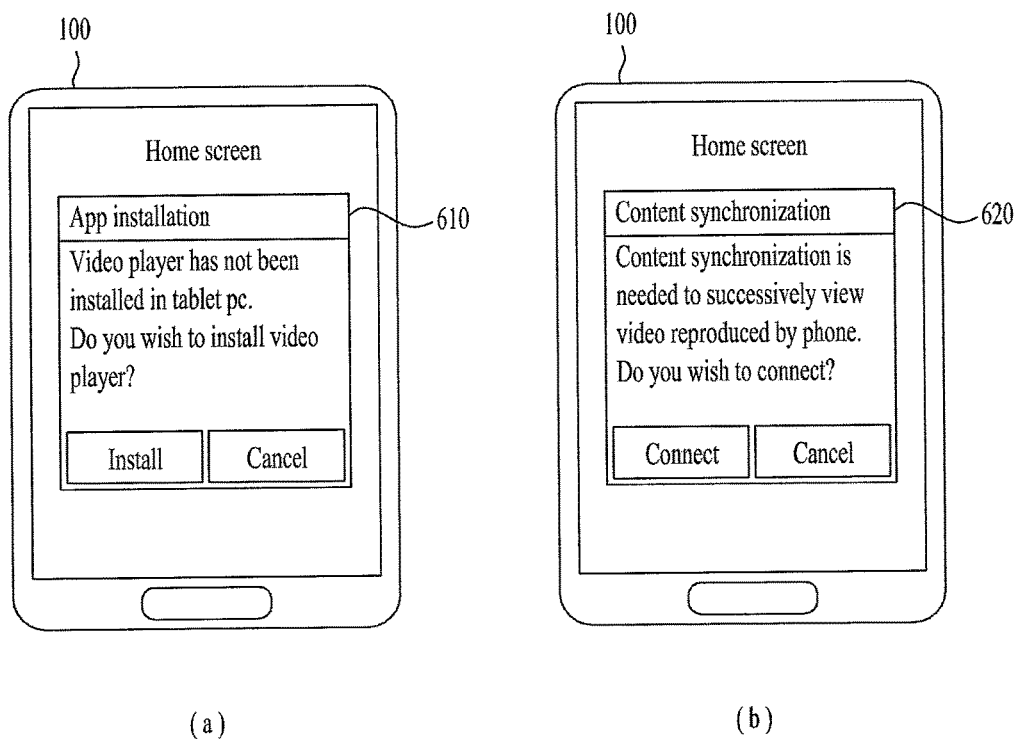
FIG. 6 is a view showing an example of operation of the mobile terminal when there is any insufficient element to provide seamlessness in the mobile terminal according to the embodiment of the present invention.

FIG. 6 is a view showing an example of operation of the mobile terminal 100 when there is an insufficient element to provide seamlessness in the mobile terminal 100 according to the embodiment of the present invention. First, when the same application as that executed by the external device 200 is not installed in the mobile terminal 100, the controller 180 can display a popup window 610 to ask the user whether the corresponding application is to be installed. Thus, the controller 180 can check the kind of the application executed by the external device 200 from the application execution information and search for a link enabling the same application to be installed or downloaded.

The controller 180 can acquire information regarding the content reproduced through the application executed by the external device 200 from the application execution information. When the application is executed using the method as shown in FIG. 5 after the corresponding application executed by the external device 200 has finished, however, the controller 180 may not acquire a list of contents stored in the external device 200.

In this instance, the controller 180 can display a popup window 620 to ask the user whether a list of contents is to be received from the external device 200 for content synchronization. This procedure may be omitted when a list of contents, possessed by the external device 200, which can be reproduced through the corresponding application is included in the application execution information.

Next, a method of acquiring content after acquiring a list of contents from the external device 200 will be described with reference to FIG. 7. In particular, FIG. 7 is a view showing an example of a method of receiving content from the external device 200 in the mobile terminal 100 according to the embodiment of the present invention.

Figure 7:
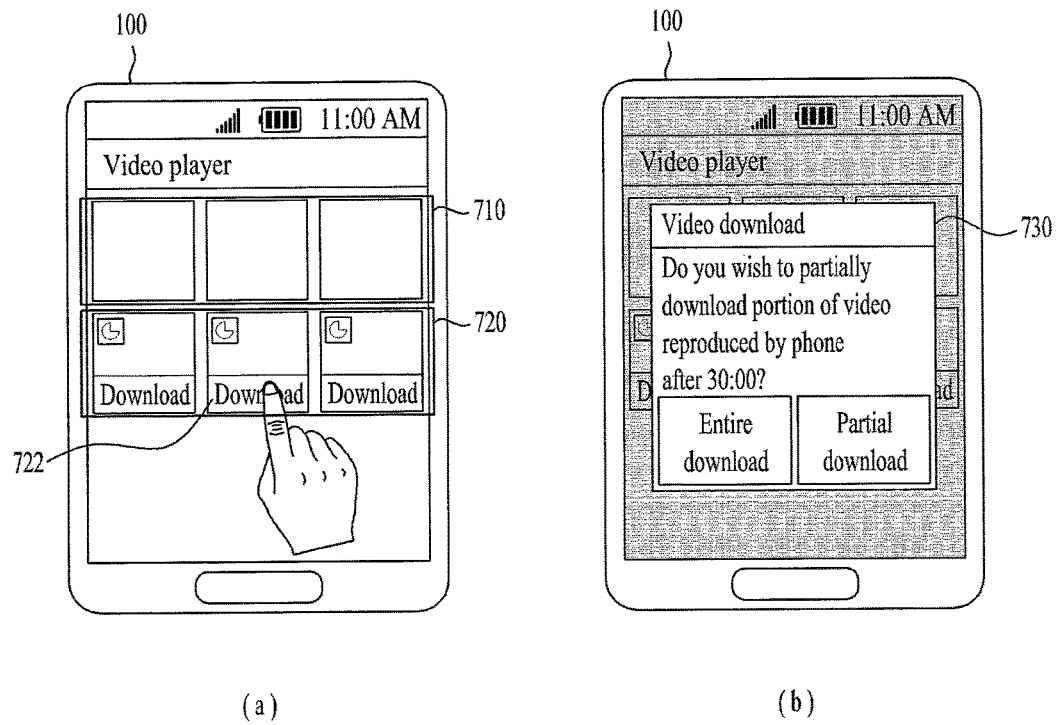
FIG. 7 is a view showing an example of a method of receiving content from the external device in the mobile terminal according to the embodiment of the present invention.
Figure 7:
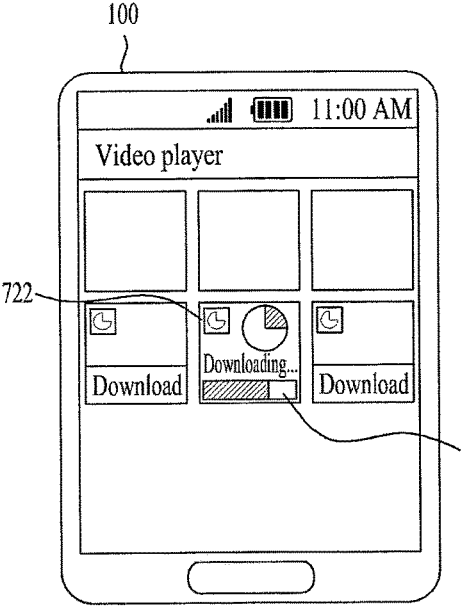

In FIG. 7, it is assumed that a video application is executed using the method shown in FIG. 5. As the video application is executed, a list of videos that can be reproduced may be displayed as shown in FIG. 7(*a*). Here, thumbnails 710 of the videos stored in the memory 160 of the mobile terminal 100 can be displayed in general thumbnail forms. However, an indicator corresponding to a source device and a download button may be given to thumbnails 720 which are not currently present in the memory 160 but correspond to contents acquired from the external device 200 through content synchronization.

When the download button of the second one 722 of the thumbnails 720 corresponding to the contents stored in the external device 200 is selected, the controller 180 can request the external device 200 to transmit the corresponding content. When information regarding the reproduction details of the corresponding content on the external device 200 is received from the external device 200 in response to the request, the controller 180 can display a popup window 730 to ask the user whether the entirety of the content is to be downloaded or only the remaining portion of the content excluding the portion of the content reproduced by the external device 200 is to be downloaded as shown in FIG. 7(*b*).

Subsequently, the corresponding content may be transmitted from the external device 200 according to user selection and the controller 180 can display a download progress bar 740 on the thumbnail 722 corresponding to the content as shown in FIG. 7(*c*). When the transmission of the content is completed, the source device indicator or the download button may disappear from the corresponding thumbnail since the corresponding content is the one stored in the memory 160 of the mobile terminal 100.

Meanwhile, the content may be downloaded from the external device 200 to the mobile terminal 100 in a file form as described with reference to FIG. 7 or may be transmitted in a streaming mode. When the content is transmitted in the streaming mode, however, steaming may not be smooth depending upon a protocol constituting the data channel. In this instance, conversion into a download mode may be possible, which will be described with reference to FIG. 8.

Figure 8:
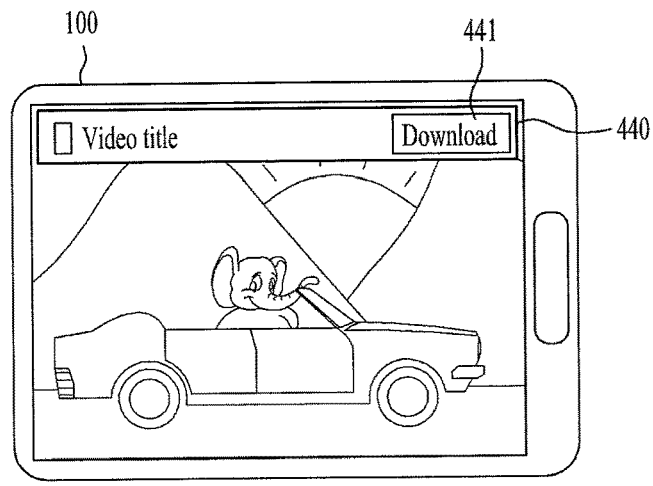
FIG. 8 is a view showing an example of a method of converting content streamed from the external device into a download mode in the mobile terminal according to the embodiment of the present invention.
Figure 8:
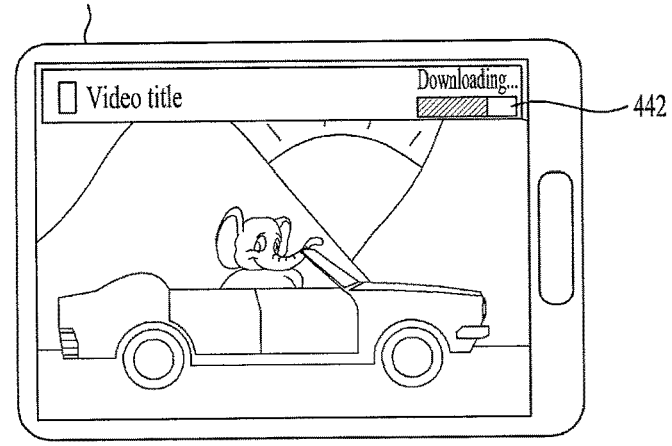
Figure 8:
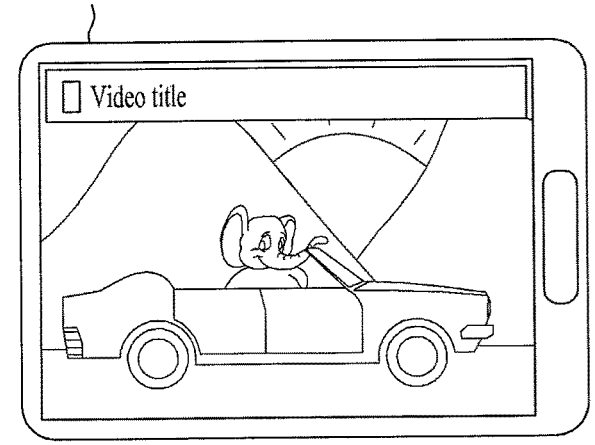

FIG. 8 is a view showing an example of a method of converting content streamed from the external device 200 into a download mode in the mobile terminal 100 according to the embodiment of the present invention.

When any one of the thumbnails 720 corresponding to the contents acquired from the external device 200 through content synchronization in a situation as shown in FIG. 7(*a*), the controller 180 can reproduce the content corresponding to the thumbnail selected from the external device 200 in the streaming mode. In this instance, content information 440 indicating a source device, a title of the content, and whether download is possible may be displayed at the upper end of the execution screen of the video application as shown in FIG. 8(a).

When the user wants to convert the streaming mode into a download and reproduction mode, the user can select a download button 441. As a result, the reproduction of the video may be paused and the download button 441 may be replaced by a progress bar 442 indicating download progress as shown in FIG. 8(b). When the download is completed, the controller 180 can resume the reproduction of the content using the content stored in the memory 160. In this instance, the download button 441 may disappear from the content information 440 displayed at the upper end of the execution screen of the video application as shown in FIG. 8(c).

Meanwhile, environment setting values (e.g., a brightness, reproduction speed, subtitle language/position, etc.) of the video application set in the external device 200 may be applied without change when the video application is executed in the mobile terminal 100 in order to provide higher seamlessness.

Provision of Seamlessness of a Web Browser Application

Hereinafter, examples related to a web browser application will be described with reference to FIGS. 9 to 13.

Figure 9:
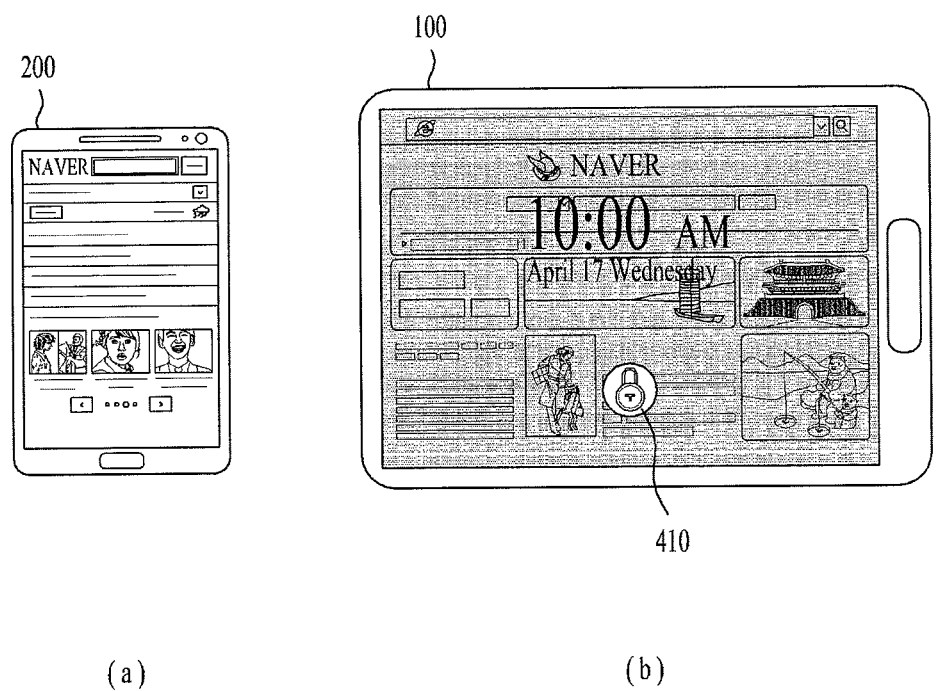
FIG. 9 is a view showing an example of a form in which a web browser application executed by the external device is driven through the mobile terminal.
Figure 9:
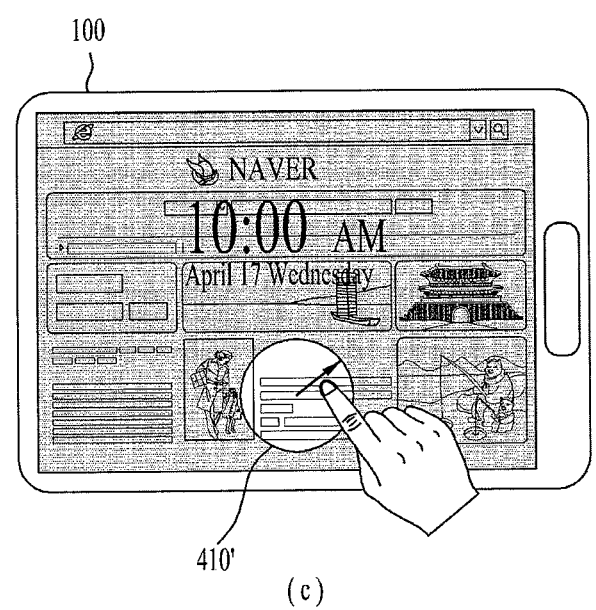

FIG. 9 is a view showing an example of a form in which a web browser application executed by the external device 200 is driven through the mobile terminal 100. In particular, FIG. 9(a) shows a web page displayed on the external device 200 through a web browser application.

Further, when the user manipulates the mobile terminal 100 to invoke a lock screen (for example, the user raises the mobile terminal 100 or manipulates a specific key button), the lock screen is displayed as shown in FIG. 9(b). An indicator 410 to release the lock screen is also displayed on the lock screen with the web page displayed on the external device 200 as the background.

When the user drags the indicator 410 a predetermined distance or more as shown in FIG. 9(c), the lock screen is released and the web browser application is executed. Further, the web page displayed last on the external device 200 is displayed through the executed web browser application.

Meanwhile, the application information may be configured in a form different from that shown in FIG. 4A and may replace a function of the indicator to release the lock screen, which will be described with reference to FIG. 10.

Figure 10:
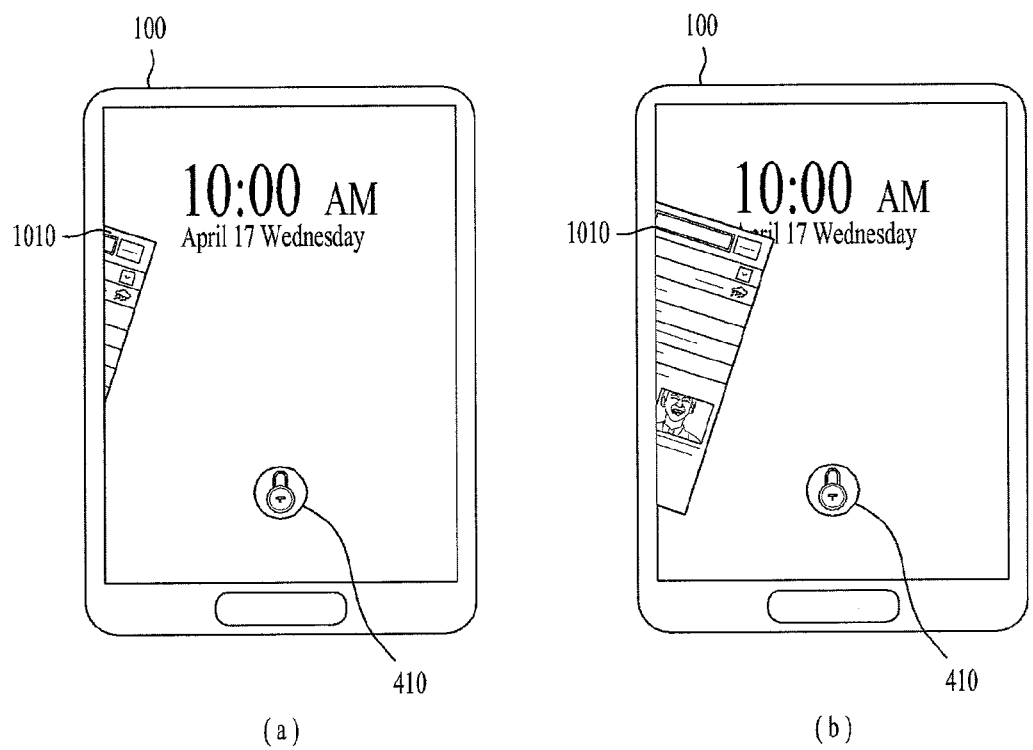
FIG. 10 is a view showing an example of a method of selecting an application to be seamlessly executed in the mobile terminal according to the embodiment of the present invention.

In particular, FIG. 10 is a view showing another example of a method of selecting an application to be seamlessly executed in the mobile terminal 100 according to the embodiment of the present invention. In FIG. 10, a data channel for exchange of the application execution information between the mobile terminal 100 and the external device 200 is established and the lock screen of the mobile terminal 100 is invoked while the web browser is being reproduced on the external device 200.

Referring to FIG. 10(a), a portion 1010 of the execution screen of the web browser application executed in the external device 200 is displayed at the left edge of a general lock screen including an indicator 410 to release the lock screen. When the user drags the portion 1010 of the execution screen toward the middle of the touchscreen a predetermined distance or more as shown in FIG. 10(b), the controller 180 can determine that the lock screen has been released so as to correspond to the web browser application and may seamlessly execute the web browser application according to the application execution information.

When the execution of the web browser application on the external device 200 is finished and then the lock screen of the mobile terminal 100 is invoked, the lock screen as shown in FIG. 5 may be displayed. Of course, when the touch drag input is released from the icon 527 corresponding to the web browser application, the web browser application may be executed on the mobile terminal 100.

In addition, in this embodiment, the mobile terminal 100 can acquire the web browser application through the application execution information including web page reading sequence and history information for offline browsing or according to user selection, which will be described with reference to FIG. 11.

Figure 11:
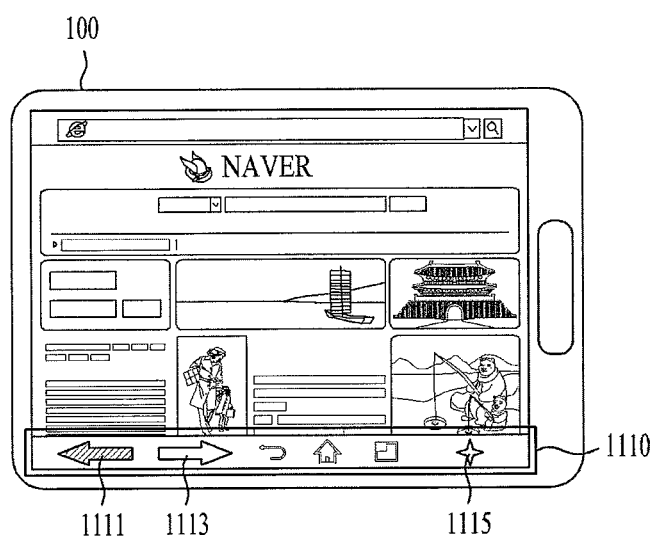
FIG. 11 is a view showing an example of a content download method for seamlessness in reading sequence and offline page reading in the mobile terminal according to the embodiment of the present invention.
Figure 11:
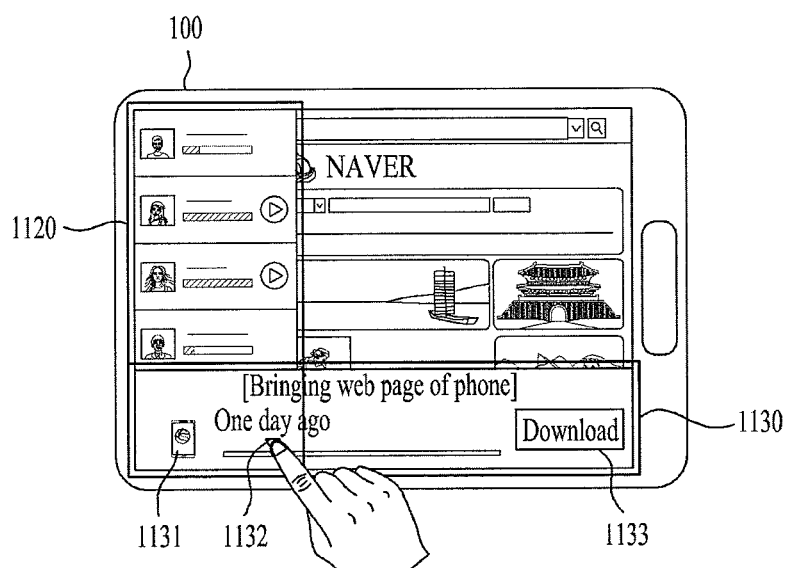

FIG. 11 is a view showing an example of a content download method for seamlessness in reading sequence and offline page reading in the mobile terminal 100 according to the embodiment of the present invention. Referring to FIG. 11(a), as information regarding web page reading sequence until the web browser application is executed last on the external device 200 and the user switches the device from the external device 200 to the mobile terminal 100 is provided as the application execution information, a "previous page" button 1111 of the web browser is enabled.

When a previous page returns from the web page read last immediately before switching from the external device 200 to the mobile terminal 100 (e.g., web pages are read in order of web page a, web page b, and web page c and then return to web page b is performed), a "next page" button 1113 is also enabled. In addition, when a history button 1115 is selected, content included in the web page read by the external device 200 per lapse time may be selectively downloaded as shown in FIG. 11(b).

Specifically, a time range region 1130 may be displayed at the lower end of the screen and contents included in the web page read by the user during a period selected from the time range region may be displayed in a content list region 1120 at the left of the screen. The user can individually download content through the content list region or all contents corresponding to a period selected through a slider 1132 using a download button 1133 at once.

A source device indicator 1131 may be provided in time range region 1130. In FIG. 11, the source device indicator may be displayed as a smartphone-shaped icon so as to correspond to external device 200. The user can read web pages that have been previously read through the web browser application using the content downloaded as described above in an offline state without access to the Internet.

Environment setting values (e.g., the position of a web page displayed on the external device 200, magnifying power, brightness, login information, site blocking information, cookie information, etc.) of the web browser application set/input in the external device 200 may be applied without change when the web browser application is executed in the mobile terminal 100 in order to provide higher seamlessness.

Figure 12:
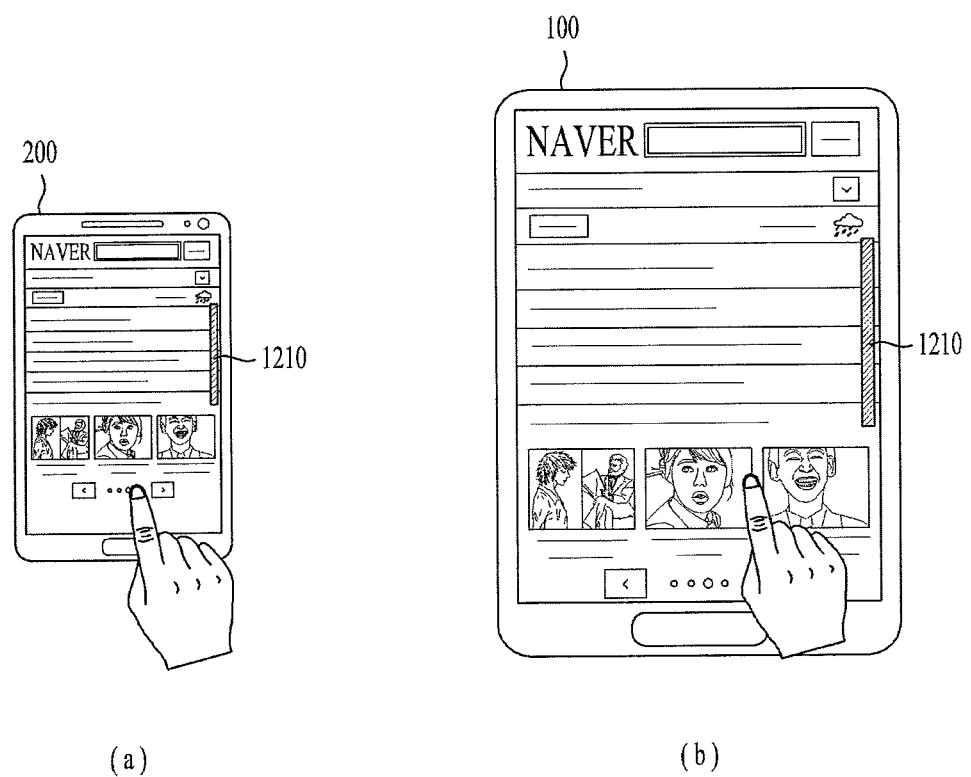
FIG. 12 is a view showing an example of a form in which the position of a web page displayed on the external device is maintained in the mobile terminal according to the embodiment of the present invention.

Hereinafter, a form in which the position of a web page displayed on the external device 200 is maintained in the mobile terminal 100 will be described with reference to FIG. 12. In particular, FIG. 12 is a view showing an example in which the position of a web page displayed on the external device 200 is maintained in the mobile terminal 100 according to the embodiment of the present invention.

FIG. 12(a) shows a scroll bar 1210 is moved downward as downward scrolling is performed when a specific web page is read on the external device 200 through the web browser application. When the lock screen of the mobile terminal 100 is released so as to correspond to the web browser application in this situation, the web browser application may be executed on the touchscreen, the same portion as the specific web page on the external device 200 may be displayed, and a scroll bar 1210' may be moved downward so as to correspond to the currently displayed portion as shown in FIG. 12(b).

Figure 13:
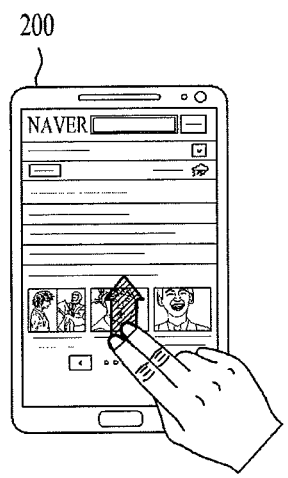
FIG. 13 is a view showing an example of a method of seamlessly executing an application according to a command input by an external device in a mobile terminal according to another embodiment of the present invention.
Figure 13:
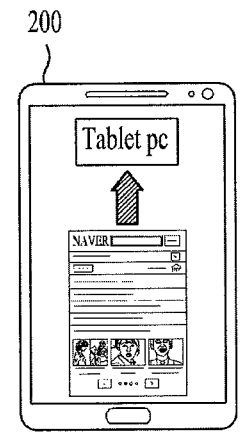
Figure 13:
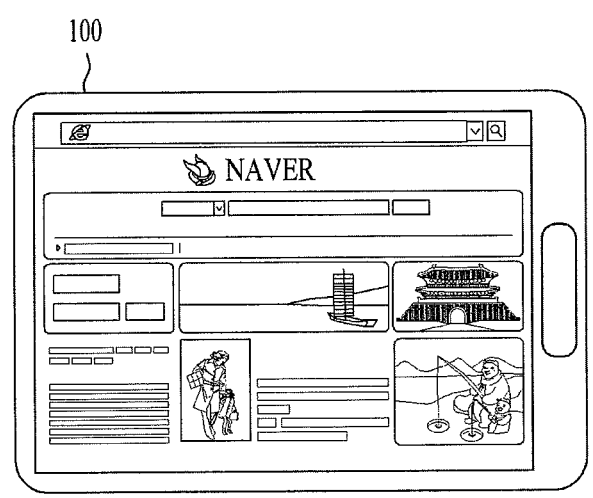

Meanwhile, in another embodiment of the present invention, the mobile terminal 100 can directly seamlessly execute an application according to a command input from the external device 200 without release of the lock screen, which will be described with reference to FIG. 13. In particular, FIG. 13 is a view showing an example of a method of seamlessly executing an application according to a command input by an external device 200 in a mobile terminal 100 according to another embodiment of the present invention.

Referring to FIG. 13(a), while the web browser application is being executed on the external device 200, the user can simultaneously touch two or more fingers on the touch screen and drag in one direction. As a result, the screen of the web browser application may be reduced and an animation indicating transmission of the web page to an icon corresponding to a device to which seamlessness of the application will be provided, i.e. the mobile terminal 100, may be displayed as shown in FIG. 13(b).

In the mobile terminal 100, the touchscreen may be turned on and the web browser application may be executed such that the web page displayed on the external device 200 can be automatically displayed on the mobile terminal 100 as shown in FIG. 13(c).

Provision of Seamlessness of a Gallery Application

Figure 14:
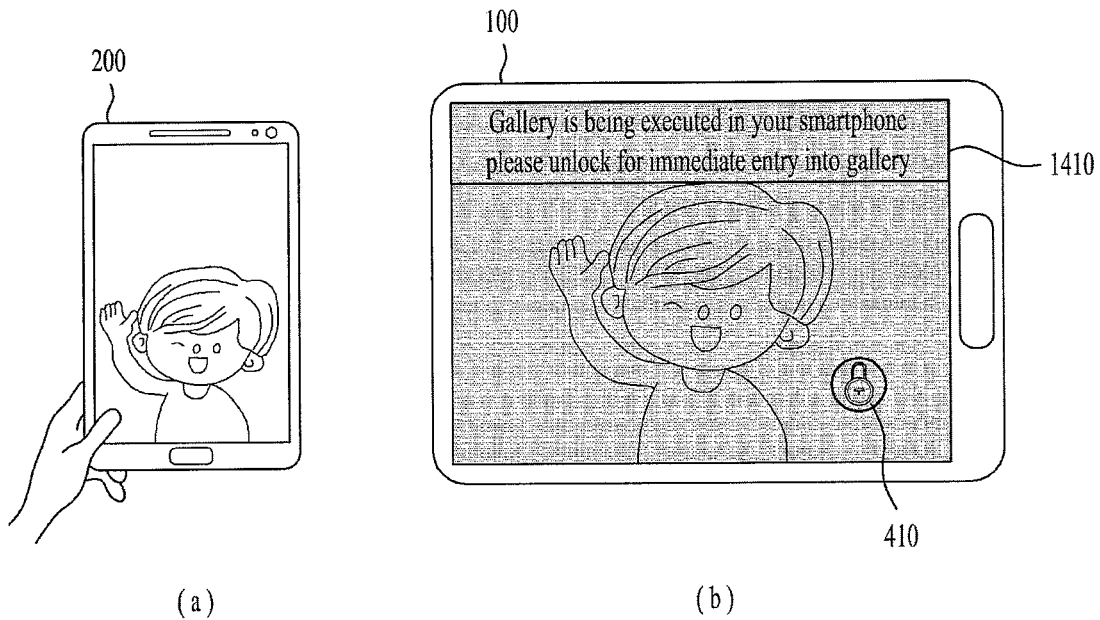
FIG. 14 is a view showing an example of a form in which a gallery application executed by the external device is driven through the mobile terminal.

Hereinafter, examples related to a gallery application will be described with reference to FIGS. 14 to 17. In particular, FIG. 14 is a view showing an example of a gallery application executed by the external device 200 being driven through the mobile terminal 100. FIG. 14(a) shows a specific image is displayed on the external device 200 through a gallery application.

Further, when the user manipulates the mobile terminal 100 to invoke a lock screen (for example, the user raises the mobile terminal 100 or manipulates a specific key button), the lock screen is displayed as shown in FIG. 14(b). An indicator 410 to release the lock screen is displayed on the lock screen with the specific image displayed on the external device 200 as the background.

When the user drags the indicator 410 a predetermined distance or more, the lock screen may be released and text 1410 indicating execution of the gallery application is displayed at the upper end of the screen. When the gallery application is executed, an image displayed last on the external device 200 may be displayed.

Figure 15:
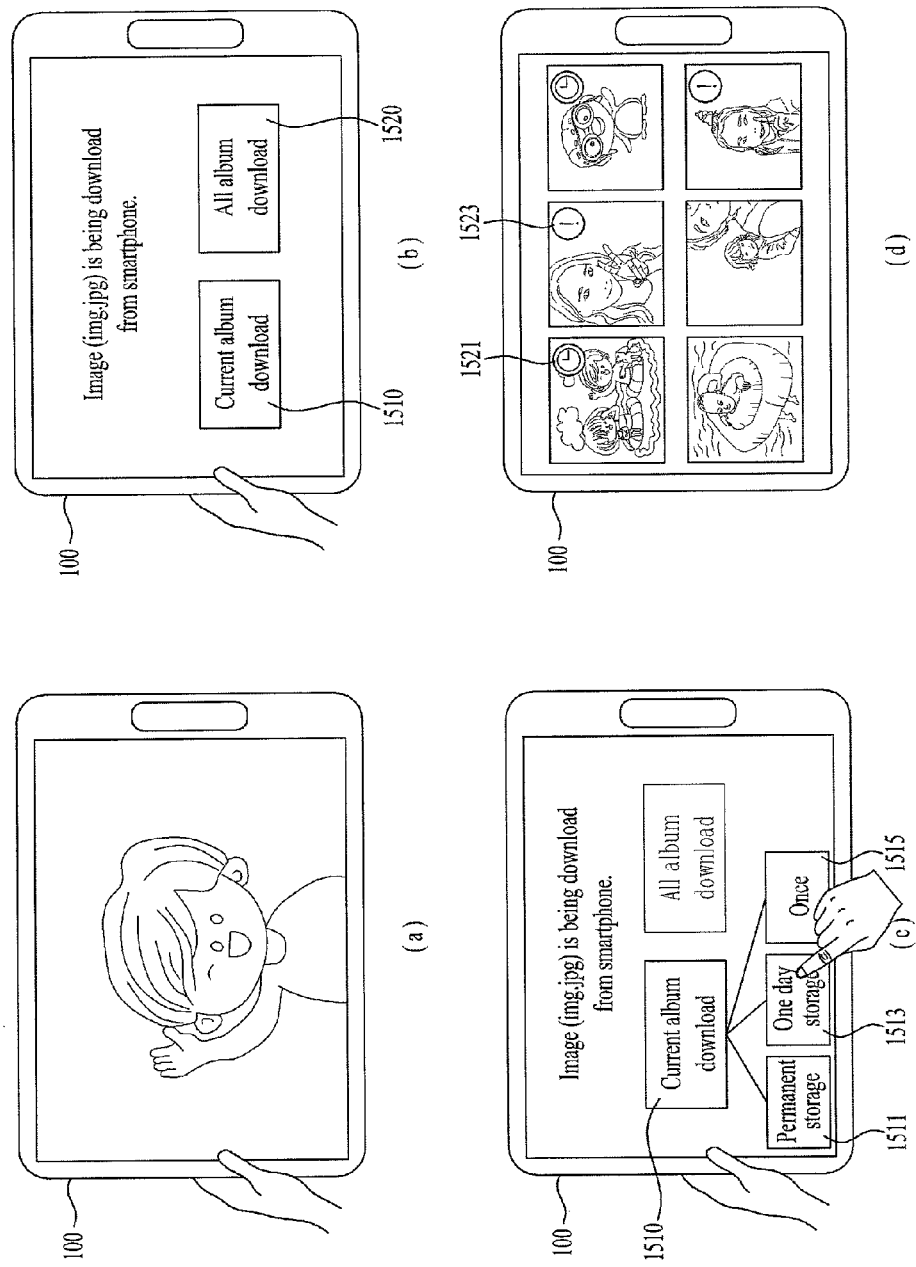
FIG. 15 is a view showing an example of an image acquisition method for providing seamlessness in the mobile terminal according to the embodiment of the present invention.

Next, an image acquisition method will be described with reference to FIG. 15. In particular, FIG. 15 is a view showing an example of an image acquisition method for providing seamlessness in the mobile terminal 100 according to the embodiment of the present invention.

While the gallery application is being executed on the external device 200, the process shown in FIG. 14 may be performed. When the execution of the gallery application on the external device 200 is finished and then the lock screen of the mobile terminal 100 is invoked, the gallery application may be executed on the mobile terminal 100 through the process shown in FIG. 5.

Further, when the same image or album (e.g., a plurality of images per folder) as that displayed last on the external device 200 is present in the memory 160 of the mobile terminal 100, the corresponding image may be displayed through the gallery application as shown in FIG. 15(a). When the corresponding image or an album including the same is not present in the memory 160 of the mobile terminal, a menu for bringing an image from the external device 200 may be displayed as shown in FIG. 15(b).

The menu may include a menu 1510 for downloading only an album including a specific image and a menu 1520 for downloading all albums stored in the external device 200. However, the image downloaded to provide seamlessness of the gallery application may not be used any more once the image is used. When a download mode is selected as shown in FIG. 15(c), therefore, menus 1511 to 1515 to select a period for which the corresponding album will be stored in the memory 160 may be displayed. As a result, when a thumbnail list is displayed through the gallery application as shown in FIG. 15(d), different indicators 1521 and 1523 per image storage period may be given to the album/image thumbnails.

Figure 16:
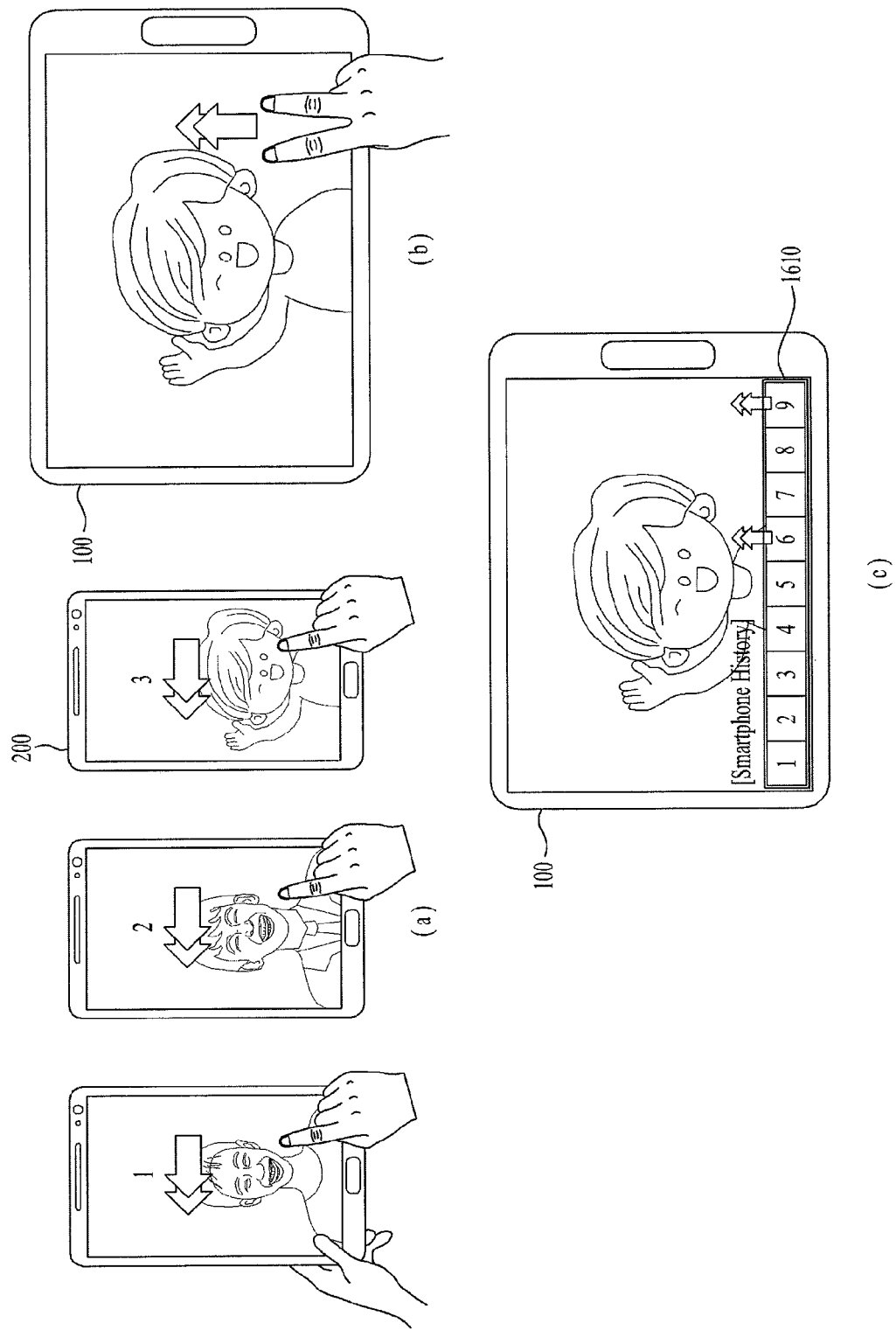
FIG. 16 is a view showing an example of a method of providing seamlessness of image reading sequence in the mobile terminal according to the embodiment of the present invention.

According to a specific embodiment of the present invention, the mobile terminal 100 can acquire information regarding image reading sequence through the gallery application based on the application execution information, which will be described with reference to FIG. 16. In particular, FIG. 16 is a view showing an example of a method of providing seamlessness of image reading sequence in the mobile terminal 100 according to the embodiment of the present invention.

Referring to FIG. 16(a), the gallery application may be executed on the external device 200 such that a plurality of images is sequentially read in a left direction. Subsequently, when the gallery application is seamlessly executed on the mobile terminal 100, the user can input a multi-touch drag in one direction as shown in FIG. 16(b). As a result, thumbnails 1610 corresponding to the respective images read by the external device 200 may be displayed at the lower end of the screen in order of reading as shown in FIG. 16(c).

According to a further embodiment of the present invention, a control right may be transmitted to the external device 200 such that the external device 200 can function as a remote controller of the mobile terminal 100, which will be described with reference to FIG. 17. In particular, FIG. 17 is a view showing an example of a method of transmitting a control right to an external device 200 in a mobile terminal 100 according to a further embodiment of the present invention.

When seamlessness of the gallery application executed on the external device 200 is provided through the mobile terminal 100, the user can input a multi-touch drag in one direction as shown in FIG. 17(a). As a result, a menu 1710 for transmitting a control right to the external device 200 is displayed as shown in FIG. 17(b). When transmission of the control right is selected through the corresponding menu 1710, a message 1720 indicating that the external has acquired the control right of the mobile terminal 100 can be displayed and the gallery application may be executed as shown in FIG. 17(c). Afterwards, a command input by the external device 200 through the gallery application may be executed on the mobile terminal 100.

In addition, the form of the lock screen per application is merely illustrative and, therefore, the present invention is not limited thereto. Also, according to embodiments of the present invention, the above-described methods can be implemented in a program recorded medium as processor-readable codes. The processor-readable media may include ROM, RAM, CD-ROM, magnetic tapes, floppy discs, optical data storage devices, and the like for example and also include carrier-wave type implementations (e.g., transmission via the Internet).

The mobile terminal and the control method thereof as described above are not limited to the configurations and methods of the embodiments set forth herein. The embodiments may be selectively combined in part or in whole to form various embodiments that all fall within the scope of the invention.

According to embodiments of the present invention as described above, even when the user performs a device change, a specific application executed on the former device can be seamlessly used on the changed device. Particularly, when a task of an application executed on the external device 200 or even the application is not finished, the user can conveniently determine from the lock screen whether the corresponding application is to be executed while maintaining the execution state of the application.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling a mobile terminal, the method comprising:
    establishing, via a wireless communication unit of the mobile terminal, a wireless data channel to an external device;
    receiving, via a controller of the mobile terminal, application information from the external device for application content displayed on the external device;
    synchronizing content between an application in the mobile terminal and an application in the external device based on the application information;
    displaying, via the controller of the mobile terminal, a graphic object including the application information on a lock screen, the displayed application information including a time point from which to resume an unfinished task and a content of the unfinished task that is being currently performed by executing the application at the external device;
    in response to receiving a touch drag input on the graphic object on the lock screen, replacing the graphic object on the lock screen with additional information related to the application content displayed by the external device until the touch drag input traverses a predetermined distance or more;
    in response to the drag touch input traversing the predetermined distance or more, executing an application corresponding to the graphic object and resume performing of the unfinished task on the mobile terminal with the application starting from the time point from which to resume the unfinished task; and
    in response to receiving a touch input on the lock screen different from the touch drag input, executing a general method for unlocking the lock screen and display a home screen on the mobile terminal.

2. The method of claim 1, further comprising:
    displaying the application information corresponding to the application to be executed on the mobile terminal in a first region of the lock screen.

3. The method of claim 2, wherein the displayed application information comprises at least one of an execution screen that has been executed last on the external device, a title of the application in the mobile terminal, and an indicator corresponding to an execution state of the application in the mobile terminal.

4. The method of claim 2, wherein the displaying the application information in the first region of the lock screen is performed when the application in the external device has not finished on the external device.

5. The method of claim 1, wherein when the application in the external device has finished executing on the external device, the displaying the lock screen on the mobile terminal comprises:
    displaying a first indicator corresponding to the external device in a first region of the lock screen; and
    when the first indicator is selected, displaying a second indicator corresponding to at least one other application that has been recently used by the external device in a second region of the lock screen.

6. The method of claim 1, further comprising:
    when the application is not installed on the mobile terminal before receiving the application information from the external device, searching for the application; and
    installing the application.

7. The method of claim 1, further comprising:
    when the application in the external device and the application in the mobile terminal is a video application, acquiring video content reproduced by the external device from the external device in a streaming mode or in a download mode.

8. The method of claim 1, further comprising:
    when the application in the external device and the application in the mobile terminal is a web browser application, acquiring web page reading history information stored in the external device.

9. The method of claim 8, further comprising:
    enabling any one selected from between a previous page moving function and a next page moving function according to the history information.

10. The method of claim 1, further comprising:
    when the application in the external device and the application in the mobile terminal is a gallery application, performing image content synchronization with the external device.

11. The method of claim 10, wherein the performing the image content synchronization comprises:
    selecting an image content unit to be stored in a memory of the mobile terminal; and
    selecting a storage period of the selected image content unit.

12. A mobile terminal, comprising:
    a wireless communication unit configured to establish a wireless data channel to an external device;
    a touchscreen; and
    a controller configured to:

receive application information from the external device for application content displayed on the external device, update content of an application in the mobile terminal for synchronizing content between the application in the mobile terminal and an application in the external device based on the application information, display a graphic object including the application information on a lock screen, the displayed application information including a time point from which to resume an unfinished task and a content of the unfinished task that is being currently performed by executing the application at the external device, in response to receiving a touch drag input on the graphic object on the lock screen, replace the graphic object on the lock screen with additional information related to the application content displayed by the external device until the touch drag input traverses a predetermined distance or more, in response to the drag touch input traversing the predetermined distance or more, execute an application corresponding to the graphic object and resume performing of the unfinished task on the mobile terminal with the application starting from the time point from which to resume the unfinished task, and in response to receiving a touch input on the lock screen different from the touch drag input, execute a general method for unlocking the lock screen and display a home screen on the mobile terminal.

13. The mobile terminal of claim 12, wherein the controller is further configured to:
display the application information corresponding to the application to be executed on the mobile terminal in a first region of the lock screen.

14. The mobile terminal of claim 13, wherein the displayed application information comprises at least one of an execution screen that has been executed last on the external device, a title of the application in the mobile terminal, and an indicator corresponding to an execution state of the application in the mobile terminal.

15. The mobile terminal of claim 13, wherein the controller is further configured to display the application information in the first region of the lock screen when the application in the external device has not finished executing on the external device.

16. The mobile terminal of claim 12, wherein when the application in the external device has finished on the external device, the controller is further configured to:
display a first indicator corresponding to the external device in a first region of the lock screen, and
when the first indicator is selected, display a second indicator corresponding to at least one other application that has been recently used by the external device in a second region of the lock screen.

* * * * *